C. K. WOODIN, J. F. KOLCZYNSKI AND G. E. KARL.
AGRICULTURAL IMPLEMENT WHEEL.
APPLICATION FILED DEC. 26, 1918.

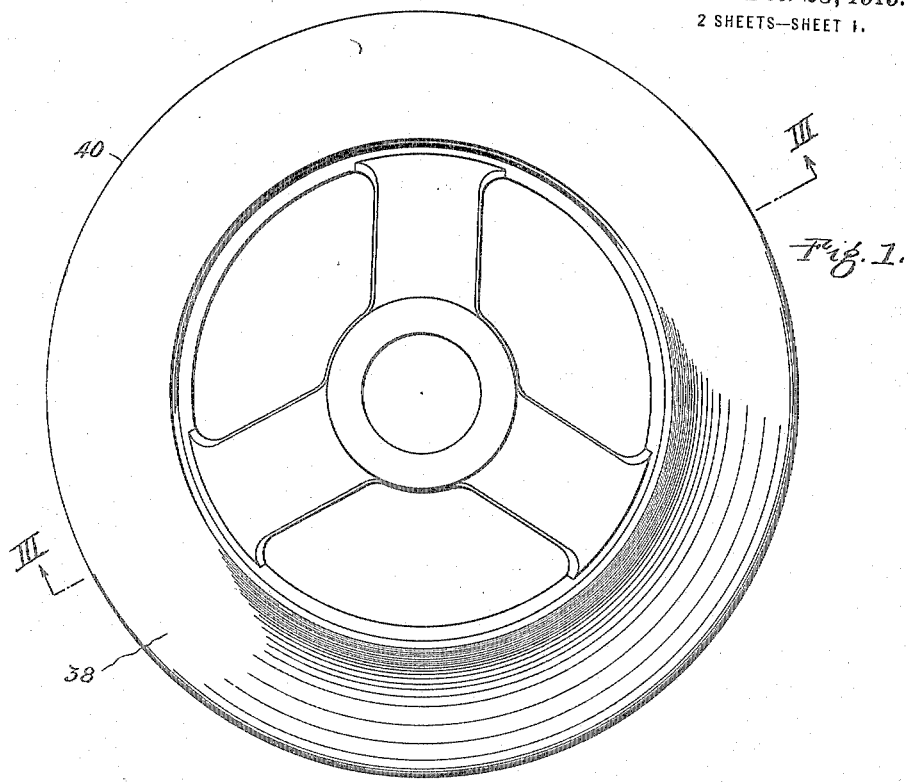
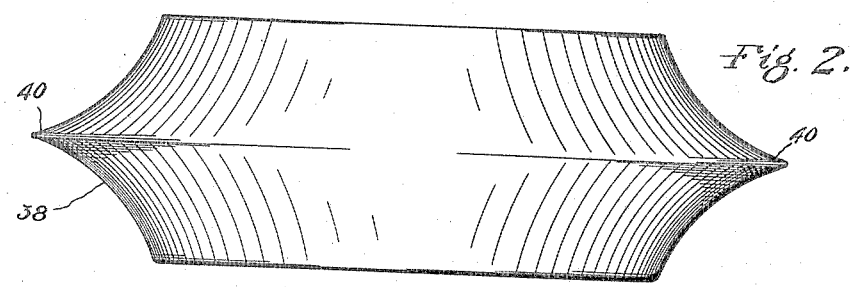
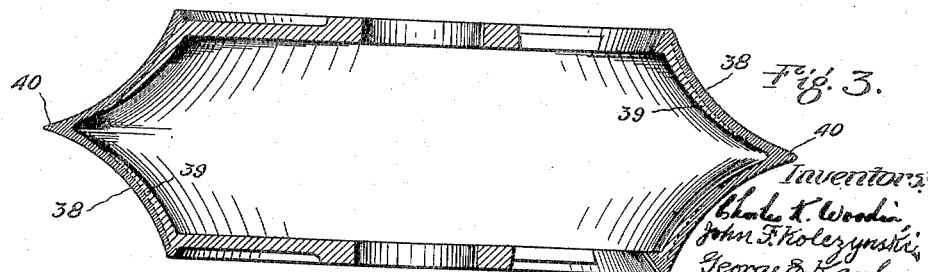

1,325,770.

Patented Dec. 23, 1919.
2 SHEETS—SHEET 2.

UNITED STATES PATENT OFFICE.

CHARLES K. WOODIN, JOHN F. KOLCZYNSKI, AND GEORGE E. KARL, OF BEREA, OHIO, ASSIGNORS TO THE DUNHAM COMPANY, OF BEREA, OHIO, A CORPORATION OF OHIO.

AGRICULTURAL-IMPLEMENT WHEEL.

1,325,770.      Specification of Letters Patent.      Patented Dec. 23, 1919.

Application filed December 26, 1918. Serial No. 268,386.

*To all whom it may concern:*

Be it known that we, CHARLES K. WOODIN, JOHN F. KOLCZYNSKI, and GEORGE E. KARL, citizens of the United States, residents of Berea, county of Cuyahoga, and State of Ohio, have invented new and useful Improvements in Agricultural-Implement Wheels, of which the following is a specification, the principle of the invention being herein explained, and the best mode in which we have contemplated applying that principle, so as to distinguish it from other inventions.

Our invention relates to exteriorly chilled hollow wheels having an unchilled strengthening portion backing the chilled portion; and more particularly to such wheels for use in agricultural implements for pulverizing or mulching the soil.

Wheels of the above described character when intended for agricultural purposes depend for their effectiveness upon the concentration of the weight of the machine upon hard lumps in order that such lumps may be cut, broken and cracked so that the further action of the wheels in rolling over the pieces may properly pulverize them. Furthermore, we have found that such effectiveness is enhanced by providing the wheel with a sharp cutting edge and with a hard exterior smooth surface that will resist a tendency of the moist earth to stick thereto.

Heretofore agricultural wheels have been cast of ordinary gray iron, but it was found that the desired sharpness of the edge of the above mentioned annular apex portion could not be retained, by reason of the character of the gray iron which, as is well known, is comparatively soft and quickly wears out. Furthermore, in the casting operation it was found impractical to provide an initially sharp edge for the reason that these wheels have always been cast in sand molds and, as is well known, a well defined, sharp, thin structure is difficult to obtain by these means. Furthermore, these gray iron wheels have a rough exterior surface to which the moist earth adhered readily and thus impeded the ready movement of the implement over the ground, as well as interfering with the proper mulching or pulverizing of the soil. Such rough exterior surface, furthermore, required an excessive amount of paint or pigment which is usually applied thereto after the manufacturing is complete and before shipping to the user.

In addition, it has been found necessary to reduce the cost of the production of these wheels, inasmuch as a soil pulverizer includes in its structure a great number thereof and the labor in producing wheels of this character is now a limiting factor in the production of soil pulverizers. Furthermore, the price at which soil pulverizers must be sold at the present time prohibits the improvement of the wheels by methods which would increase the cost.

Among the objects of our invention, therefore, is to produce a hollow cast wheel having a rim portion comprising a chilled outer peripheral structure and a backing of softer metal for strengthening purposes; further to provide for agricultural purposes such wheel having a sharp cutting edge for effectively treating lumps, and a smooth exterior surface to prevent the sticking of moist earth thereto; further to produce a wheel whose rim portions are formed with two concave portions outwardly converging to a sharp annular apex; further the effecting of an outer chilled portion of maximum thickness at the cutting edge of the wheel and gradually decreasing in thickness laterally while the unchilled backing progressively increases in thickness laterally from the cutting edge; further to provide a more simple and effective wheel and produce the same with the maximum of efficiency and economy; and such further objects, advantages and capabilities as will later more fully appear.

The particular process and the form of mold used to produce our improved wheel are described, respectively, in pending applications Serial No. 282,648, filed March 14, 1919 and Serial No. 277,078, filed Feb. 14, 1919.

Our invention further resides in the combination, construction and arrangement of parts illustrated in the accompanying drawings, and while we have illustrated therein a preferred embodiment of the wheel, we wish it to be understood that the same are susceptible of modification and change without departing from the spirit of our invention.

In said annexed drawings:

Figure 1 represents upon an enlarged scale, a fragmentary axial section of one of the resultant pulverizer wheels, such section being specifically designed to illustrate the structure of the rim portion thereof.

Fig. 2 represents a side elevation of a complete wheel, and Fig. 3 a front elevation thereof.

Figure 4:
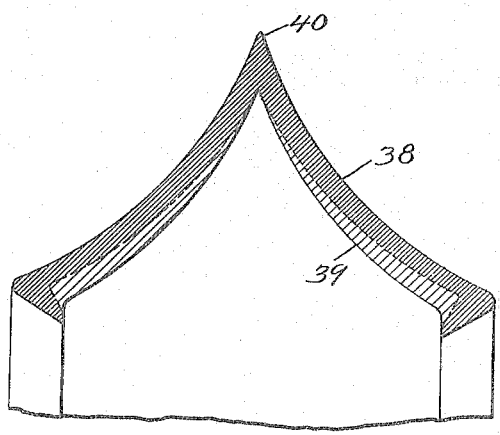
Fig. 4 represents an axial section of a completed wheel.

In producing our improved wheel, we utilize a suitable mold such as is described, for instance, in our above-mentioned application Serial No. 277,078, designed to produce the particular form of wheel desired, and pour into same a suitable mixture that will produce, when chilled, a white iron. This mold is provided with an exterior portion made of metal such as steel or iron, which will produce such chilling of the mixture when the latter is caused to come into contact with same, all as described in our application Serial No. 282,649. We have found that one mixture for this purpose comprises iron having 2.5% of silicon, $\frac{1}{10}$ of 1% of sulfur, $\frac{3}{10}$ of 1% to $\frac{5}{10}$ of 1% of phosphorus and .50 to .80% of manganese. These proportions may, of course, be varied, the amount of chill to be obtained being primarily determined by the proportion of silicon and manganese used.

This molten mixture when poured into the mold through the sprue core, flows rapidly around in both directions and fills the space between the mold and core. As soon as the mold is filled, it is opened and the casting removed therefrom. This removal is effected ordinarily without delay, the time of removal being largely governed by the amount of chill desired.

This described operation results in the arrest of the chill which takes place as soon as the molten metal strikes the cold interior surface of the iron mold and a rim portion structure is obtained such as is illustrated in Fig. 1, in which the outer portion 38 of the metal is chilled and the inner portion 39 consists of gray iron.

It will be observed from this figure that the cross-section of this rim portion consists of two similar legs angularly related and having outer and inner outwardly converging surfaces forming an apex portion 40. These legs, as a result of the previously described design of mold and core, are of a minimum thickness near the apex portion and of a maximum thickness at the lateral portion of these legs. As a result of this form of section, the apex portion and the leg portions of minimum thickness become substantially chilled throughout their entire structure and this chilled zone decreases in thickness laterally, as shown, until it reaches a minimum near the extreme lateral portions of the legs. Conversely, the gray iron portion 39 increases in thickness laterally. As a result, the gray iron is distributed in the most advantageous manner, inasmuch as the thickest portion of such gray iron is located at that part of the structure which is subjected to the greatest amount of flexural stress. In addition a smooth exterior surface is obtained and a sharp point at the apex portion, all of which, as was previously described, is desirable and contributes to the economical operation and functioning of the wheel.

While we have shown and described an integral wheel having a sharp centrally located cutting edge adapted for use in agricultural implements, we desire it to be understood that other shapes of wheels and for other purposes as well as wheels made up of two or more parts secured together may be employed without departing from the spirit of our invention.

Figure 5:
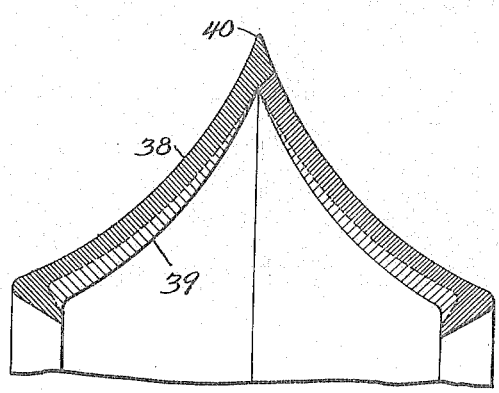
Fig. 5 represents upon an enlarged scale a fragmentary axial section of a modified form of pulverizer wheel, made in accordance with applicants' described process and apparatus.

Fig. 5 represents a modified structure of implement wheel embodying our invention. In this case instead of making the wheel of a single unitary form, it is made in two sections divided upon a medial plane perpendicular to the axis of the wheel, and these two sections may be bolted or otherwise secured together in any approved or well known manner. Of course, it will be understood that the apparatus for forming a two-part wheel would have to be modified, as will be well understood by those skilled in the art, but the two-part wheel as a whole, and the method of making each part thereof, would present precisely the same characteristics included in the present invention.

We claim:

1. In a hollow cast wheel, a rim portion comprising concave exterior faces converging outwardly, the metal of said rim being chilled on its outer face and unchilled on its inner face.

2. In a hollow cast metal wheel, a rim comprising two inclined portions meeting in an edge, the metal of said portions being chilled on their exterior faces and of a softer nature on the interior, the softer inner part adding strength to the rim.

3. In a hollow cast metal wheel, a rim comprising two inclined portions meeting in an edge, the metal of said rim being chilled on its outer face and unchilled on its inner face, such chilled and unchilled metal varying in thickness.

4. In a hollow cast metal wheel, a rim comprising two inclined portions meeting in an edge, the metal of said portions being chilled on its exterior faces and of a softer nature on the interior, the softer inner part adding strength to the rim; such chilled and softer metal varying in thickness.

5. In a hollow cast wheel, a rim portion comprising exterior faces converging outwardly and meeting in a median plane, the metal of said rim being chilled on its outer face and unchilled on its inner face.

6. As an article of manufacture, a metal wheel having a rim portion comprising two inclined portions having outwardly converging inner and outer surfaces, said outer surfaces meeting in an apex, the metal forming the outer surfaces being chilled and hard and that forming the inner surfaces being unchilled and soft.

7. A hollow cast metal wheel for agricultural purposes comprising a rim portion composed of two concavo-convex portions converging outwardly to an apex, said portions each having its exterior face of white iron and its interior face of gray iron, the white iron being of maximum thickness at the said sharp edge and decreasing in thickness laterally.

8. A hollow cast metal wheel for agricultural purposes comprising a rim portion composed of two concavo-convex portions converging outwardly to an apex, said portions each having its exterior face of white iron and its interior face of gray iron, the white iron being of maximum thickness at the said sharp edge and decreasing in thickness laterally, and the gray iron decreasing in thickness in the reverse direction, whereby the strength of the rim progressively increases as its inclination approaches the horizontal.

9. A hollow cast metal wheel for agricultural purposes comprising a rim portion composed of two inclined portions converging outwardly to an apex, said portions each having its exterior face of white iron and its interior face of gray iron, the white iron being of maximum thickness at said apex and decreasing in thickness as said apex is receded from.

Signed by us this 30th day of October, 1918.

C. K. WOODIN.
JOHN F. KOLCZYNSKI.
GEORGE E. KARL.